United States Patent
Takechi et al.

(10) Patent No.: US 11,408,722 B2
(45) Date of Patent: Aug. 9, 2022

(54) OCT MEASURING DEVICE AND OCT MEASURING METHOD

(71) Applicant: Panasonic Intellectual Property Management Co., Ltd., Osaka (JP)

(72) Inventors: Yohei Takechi, Osaka (JP); Jun Yokoyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/241,125

(22) Filed: Apr. 27, 2021

(65) Prior Publication Data
US 2021/0381818 A1 Dec. 9, 2021

(30) Foreign Application Priority Data

Jun. 3, 2020 (JP) .............................. JP2020-096969

(51) Int. Cl.
*G01B 9/02* (2022.01)
*G01B 9/02001* (2022.01)
(Continued)

(52) U.S. Cl.
CPC ....... *G01B 9/0201* (2013.01); *G01B 9/02004* (2013.01); *G01B 9/02091* (2013.01)

(58) Field of Classification Search
CPC ............ G01B 9/02091; G01B 9/02004; G01B 9/0201; G01B 9/02062; G01B 9/02064;
(Continued)

(56) References Cited

U.S. PATENT DOCUMENTS

| 9,310,563 B2 * | 4/2016 | Rubio Guivernau ................... G02B 6/29376 |
| 2009/0002713 A1 * | 1/2009 | Ohbayashi ......... G01B 9/02091 356/477 |

(Continued)

FOREIGN PATENT DOCUMENTS

| JP | 2007-510143 | 4/2007 |
| JP | 2013-009734 | 1/2013 |

(Continued)

OTHER PUBLICATIONS

Sairam Iyer, Stéphane Coen, and Frédérique Vanholsbeeck, "Dual-fiber stretcher as a tunable dispersion compensator for an all-fiberoptical coherence tomography system," Opt. Lett. 34, 2903-2905 (2009) (Year: 2009).*

(Continued)

*Primary Examiner* — Tarifur R Chowdhury
*Assistant Examiner* — Jonathon Cook
(74) *Attorney, Agent, or Firm* — McDermott Will & Emery LLP

(57) ABSTRACT

OCT measuring device in the present exemplary embodiment includes: wavelength sweep light source that emits light of which a wavelength is swept; optical interferometer that divides the light into measurement light and reference light, emits measurement light toward measurement surface of measuring target object, and generates an optical interference intensity signal indicating an intensity of interference between measurement light reflected from measurement surface and reference light; electro-optic element which is a phase modulator arranged in a light path of optical interferometer; measurement processor which is a signal generator that derives a position of measurement surface and generates a phase amount indicator signal that indicates a phase amount of phase modulator based on the optical interference intensity signal; and electro-optic element con- (Continued)

troller which is a phase amount controller that controls the phase amount given to the light that is transmitted through phase modulator.

9 Claims, 9 Drawing Sheets

(51) Int. Cl.
  *G01B 9/02091* (2022.01)
  *G01B 9/02004* (2022.01)
(58) Field of Classification Search
  CPC ............ G01B 9/02067; G01B 9/02072; G01B 9/02075
  See application file for complete search history.

(56) References Cited

U.S. PATENT DOCUMENTS

| | | | |
|---|---|---|---|
| 2009/0027689 A1 | 1/2009 | Yun et al. | |
| 2010/0014089 A1* | 1/2010 | Yamada | G01B 9/02091 356/450 |
| 2010/0141829 A1* | 6/2010 | Jalali | A61B 5/0062 382/280 |
| 2011/0009752 A1* | 1/2011 | Chen | A61B 5/0066 600/478 |
| 2011/0170111 A1* | 7/2011 | Rolland | G01B 9/02081 356/479 |
| 2011/0299091 A1 | 12/2011 | Yun et al. | |
| 2013/0003015 A1 | 1/2013 | Kurosaka | |
| 2013/0242309 A1* | 9/2013 | Yuan | G01B 9/02004 356/479 |
| 2014/0029012 A1 | 1/2014 | Ogawa | |
| 2014/0063506 A1* | 3/2014 | Kang | G01B 9/02083 356/451 |
| 2015/0077755 A1 | 3/2015 | Yun et al. | |
| 2015/0369586 A1 | 12/2015 | Fukuhara et al. | |
| 2016/0047644 A1* | 2/2016 | Wong | G01B 9/02004 356/479 |
| 2016/0252340 A1* | 9/2016 | Hollenbeck | G01B 9/02004 356/479 |
| 2016/0320170 A1 | 11/2016 | Yun et al. | |
| 2018/0153395 A1 | 6/2018 | Goto | |
| 2018/0226773 A1 | 8/2018 | Yun et al. | |
| 2020/0037872 A1* | 2/2020 | Shiba | G01B 9/02091 |

FOREIGN PATENT DOCUMENTS

| | | |
|---|---|---|
| JP | 2015-043844 | 3/2015 |
| JP | 2015-102537 | 6/2015 |
| JP | 2016-002381 | 1/2016 |
| JP | 2018-089055 | 6/2018 |
| WO | 2005/047813 | 5/2005 |
| WO | 2012/132665 | 10/2012 |

OTHER PUBLICATIONS

Yang et al "Chromatic dispersion compensation of an OCT system with a programmable spectral filter," in Optical Coherence Tomography and Coherence Techniques V, R. Leitgeb and B. Bouma, eds., vol. 8091 of Proceedings of SPIE-OSA Biomedical Optics. Paper 809125 (Year: 2011).*

* cited by examiner

OCT MEASURING DEVICE AND OCT MEASURING METHOD

BACKGROUND

1. Technical Field

The present disclosure relates to an Optical Coherence Tomography (OCT) measuring device and an OCT measuring method.

2. Description of the Related Art

In Japanese Patent Unexamined Publication No. 2013-9734, in order to realize a high-quality and high-precision optical interference measurement, a technology for realizing a so-called dispersion compensation, in which dispersion characteristics of a reference light path and a measurement light path are matched, is disclosed. In an optical interference tomographic device disclosed in Japanese Patent Unexamined Publication No. 2013-9734, light emitted from a light source is divided into measurement light on a measurement light path fiber side and reference light on a reference light path fiber side via a fiber coupler. The measurement light on the measurement light path fiber side reaches a measuring target object via a scanner mirror, a scanner lens, and an objective lens. The reference light on the reference light path fiber side reaches a reference mirror via a first dispersion compensation material and a second dispersion compensation material. Each of the first dispersion compensation material and the second dispersion compensation material arranged in the reference light path have reverse wavelength dispersion characteristics. The optical interference tomographic device disclosed in Japanese Patent Unexamined Publication No. 2013-9734 realizes the dispersion compensation of the measuring target object by combining each of the first dispersion compensation material and the second dispersion compensation material with a predetermined thickness.

SUMMARY

An OCT measuring device according to one exemplary embodiment in the present disclosure includes: a wavelength sweep light source that emits light of which a wavelength is swept; an optical interferometer that divides the light into measurement light and reference light, emits the measurement light toward a measurement surface of a measuring target object, and generates an optical interference intensity signal indicating an intensity of interference between the measurement light reflected from the measurement surface and the reference light; a phase modulator arranged in a light path of the optical interferometer; a signal generator that derives a position of the measurement surface and generates a phase amount indicator signal that indicates a phase amount of the phase modulator based on the optical interference intensity signal; and a phase amount controller that controls the phase amount given to the light that is transmitted through the phase modulator based on the phase amount indicator signal.

An OCT measuring method according to one exemplary embodiment in the present disclosure includes: detecting an optical interference intensity signal indicating an intensity of interference between measurement light emitted toward a measurement surface of a measuring target object and reflected from the measurement surface and a reference light in a state in which a phase modulator arranged in a light path of an optical interferometer that generates the optical interference intensity signal indicating the intensity of interference with the reference light gives a phase to light transmitted through the light path based on a predetermined compensation voltage control signal, and calculating instantaneous phase change data indicating an instantaneous phase value at a wave number of the light emitted from a wavelength sweep light source that emits the light of which a wavelength is swept; calculating linear instantaneous phase change data that linearly changes from an instantaneous phase value of first data to an instantaneous phase value of last data in a section between a first wave number in the first data of the instantaneous phase change data and a last wave number in the last data of the instantaneous phase change data; calculating phase compensation data by taking a difference between the instantaneous phase change data and the linear instantaneous phase change data; calculating a compensation voltage control signal based on the phase compensation data and a phase modulation control coefficient that controls a phase modulation amount, which is set in the phase modulator and a phase amount controller that controls the phase amount given to the light transmitted through the phase modulator; storing the compensation voltage control signal in a controller; giving a phase to the light transmitted through the light path using the compensation voltage control signal output from the controller based on the compensation voltage control signal in accordance with a wavelength sweep timing of the light emitted from the wavelength sweep light source by the phase modulator; and deriving a position of the measurement surface based on the optical interference intensity signal.

DETAILED DESCRIPTIONS

Figure 1:
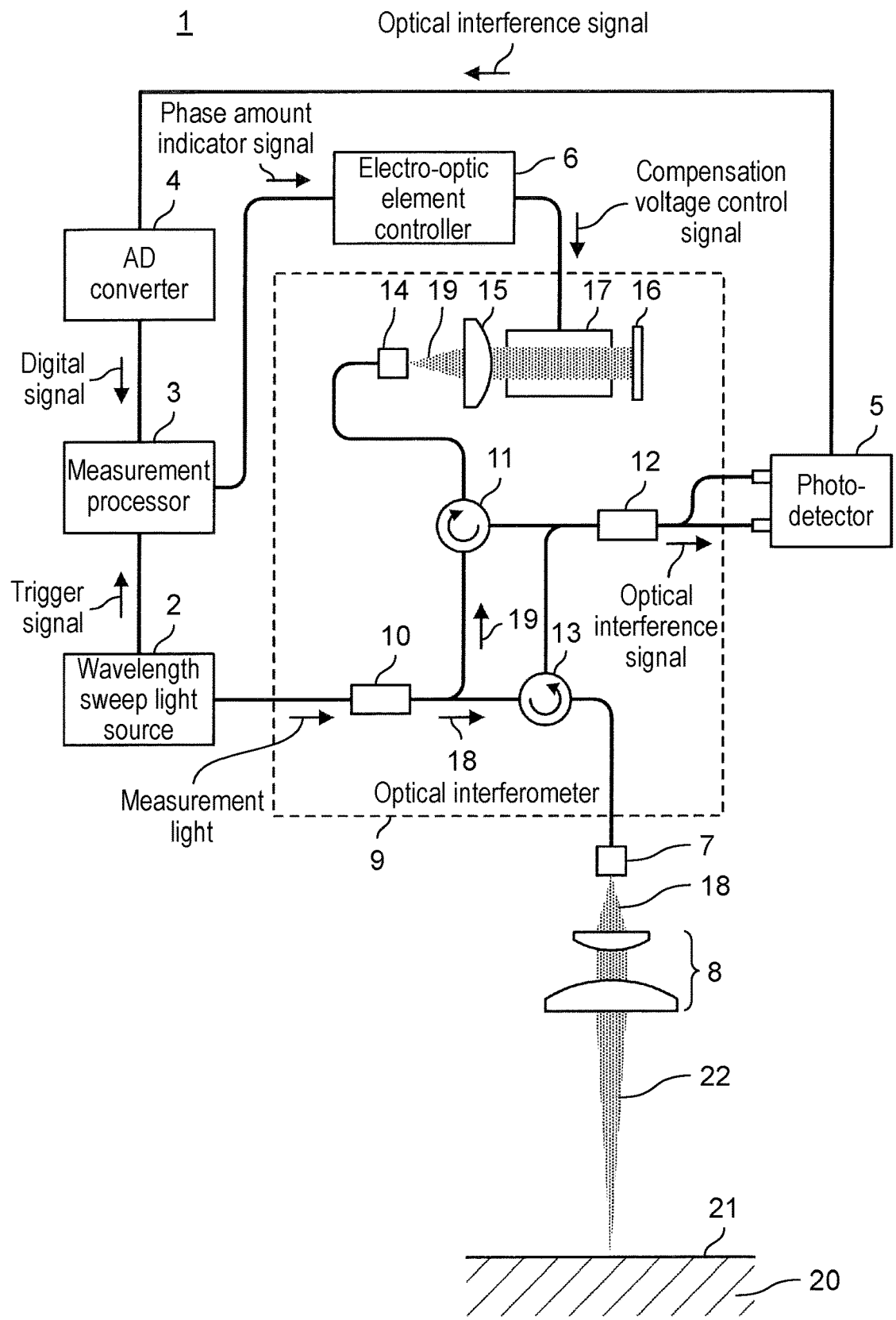
FIG. 1 is a diagram illustrating a configuration example of an OCT measuring device in an exemplary embodiment of the present disclosure.

Hereinafter, preferred exemplary embodiments of the present disclosure will be described in detail with reference to the accompanying drawings. In the present specification and the drawings, components having substantially the same function are designated by the same reference numerals, and the descriptions thereof will not be repeated.

Exemplary Embodiment

First, a background leading to the creation of an exemplary embodiment in the present disclosure will be described. OCT is known as a method of measuring a distance to a tomographic fault or a reflecting surface of a measuring target object at a high speed using optical interference, and in recent years, it is widely used in the medical field such as ophthalmology and the industrial field for measuring the penetration depth in laser processing. OCT is known as three types according to a method of acquiring an optical interference signal such as a time division type optical interference tomography (Time Domain Optical Coherence Tomography (TD-OCT)), a spectral domain type optical interference tomography (Spectral Domain Optical Coherence Tomography (SD-OCT)), and a wavelength scanning type optical interference tomography (Swept Source Optical Coherence Tomography (SS-OCT)).

In the TD-OCT, the depth direction of the measurement portion is scanned in the same manner as white interference by temporally scanning a reference surface of an optical interferometer using a wideband light source as the light source, and then, a reflected light intensity profile of the measurement light in the measurement depth direction, that is, a measurement signal is obtained. On the other hand, in the SD-OCT, the wideband light source is used as the light source and all the wavelengths are used at the same time, and a spectroscopic camera is used for detecting the optical interference signal. In addition, in the SS-OCT, using a wavelength sweep light source in which the wavelength of the light source changes in time, a signal temporally obtained by a photodetector is acquired as the optical interference signal. In the SD-OCT and the SS-OCT, by performing the Fourier transform of the obtained optical interference signal with respect to the wave number, a measurement signal similar to the measurement signal obtained by the TD-OCT is obtained. The SD-OCT and the SS-OCT have a better signal-to-noise ratio than that of the TD-OCT, and thus, a repetition measurement frequency is high. Furthermore, it can be said that the SS-OCT is superior to the SD-OCT in a point that the measurement speed can be increased, and the optical interference signal having high optical utilization efficiency and the high signal-to-noise ratio can be obtained, and the like.

In any of the above-described methods, the optical interference measurement is performed using a plurality of wavelengths, but at that time, a wavelength dispersion existing in the optical system may become a problem. As an optical system that causes the optical interference, the optical interference measuring device has a reference light path and a measurement light path that are results of branching the light from the light source for the measurement, and each has unique wavelength dispersion characteristics. The wavelength dispersion characteristics of each light path are determined by the optical components (optical fiber, lens, mirror, and the like) that configure the light path and the measuring target object on the measurement light path, but in general, the dispersion characteristics of each of the reference light path and the measurement light path do not match each other, and in this case, the intended optical interference does not occur, and thus, the optical interference signal deteriorates. Specifically, in the measurement signal, a signal corresponding to the tomographic fault, reflecting surface, and the like of the measuring target object is weakened, or a half-value width is widened due to blurs occurring in the depth direction, and therefore, the measurement quality deteriorates. Therefore, in order to realize the optical interference measurement with higher quality and high accuracy, it is necessary to perform a so-called dispersion compensation for matching the dispersion characteristics of the reference light path and the measurement light path.

Figure 11:
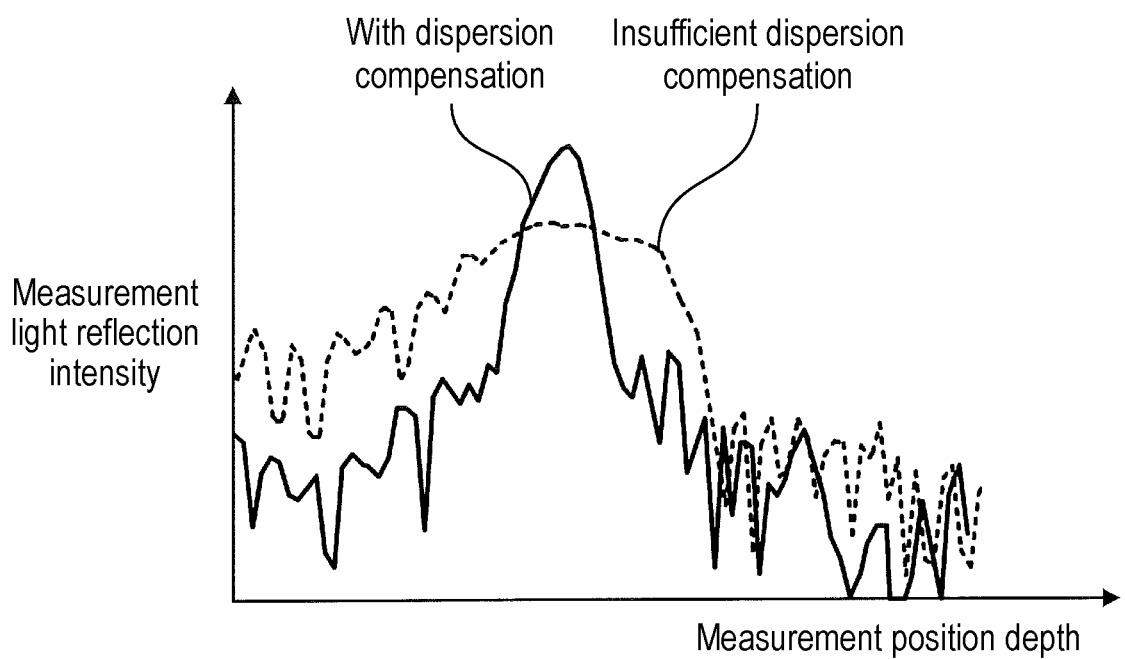
FIG. 11 is a diagram illustrating a profile of a measurement light reflection intensity distribution in the depth direction when OCT measurement is performed.

FIG. 11 is a diagram illustrating a profile of a measurement light reflection intensity distribution in the depth direction when the OCT measurement is performed. The solid line represents the measurement light reflection intensity distribution when the dispersion compensation is performed (with dispersion compensation). The dashed line represents the measurement light reflection intensity distribution when the dispersion compensation is insufficient (insufficient dispersion compensation, no dispersion compensation, and the like). When the dispersion compensation is not sufficient, the half-value width of the intensity distribution in the depth direction will become wider than when the dispersion compensation is performed, and it can be seen that the resolution in the depth direction deteriorates and the peak of the signal strength is lowered.

In the dispersion compensation method in the OCT measuring device in the related art, the dispersion compensation is realized by combining the optical lengths of two types of dispersion media having different wavelength dispersion characteristics which are adjusted to match the wavelength dispersion of the measuring target object arranged on the measurement light path side. Therefore, in the measurement light path, when the optical components configuring the light path cause the wavelength dispersion in addition to the measuring target object, the dispersion compensation for the unknown wavelength dispersions is needed in addition to the dispersion compensation for the measuring target objects with known wavelength dispersions, and thus, it is difficult to appropriately perform the dispersion compensation. In addition, every time the measuring target object changes, it is necessary to manufacture and replace the dispersion medium having an optical length suitable for the new measuring target object. Therefore, it is desired to perform the high-quality measurement while suppressing the deterioration of the OCT measurement data by compensating for various wavelength dispersions inherent in the light paths of the OCT measuring device.

In the related art, there is a room for improvement in performing the dispersion compensation for various wavelength dispersions inherent in the light paths such as the reference side light path and the measurement side light path. Non-limited examples of the present disclosure contribute to provide an OCT measuring device and an OCT measuring method that can easily perform dispersion compensation for various wavelength dispersions inherent in the light paths.

An OCT measuring device according to one exemplary embodiment in the present disclosure includes: a wavelength sweep light source that emits light of which a wavelength is swept; an optical interferometer that divides the light into measurement light and reference light, emits the measurement light toward a measurement surface of a measuring target object, and generates an optical interference intensity signal indicating an intensity of interference between the measurement light reflected from the measurement surface and the reference light; a phase modulator arranged in a light path of the optical interferometer; a signal generator that derives a position of the measurement surface and generates a phase amount indicator signal that indicates a phase amount of the phase modulator based on the optical interference intensity signal; and a phase amount controller that controls the phase amount given to the light that is transmitted through the phase modulator based on the phase amount indicator signal.

An OCT measuring method according to one exemplary embodiment in the present disclosure includes: detecting an optical interference intensity signal indicating an intensity of interference between measurement light emitted toward a measurement surface of a measuring target object and reflected from the measurement surface and a reference light in a state in which a phase modulator arranged in a light path of an optical interferometer that generates the optical interference intensity signal indicating the intensity of interference with the reference light gives a phase to light transmitted through the light path based on a predetermined compensation voltage control signal, and calculating instantaneous phase change data indicating an instantaneous phase value at a wave number of the light emitted from a wavelength sweep light source that emits the light of which a wavelength is swept; calculating linear instantaneous phase change data that linearly changes from an instantaneous phase value of first data to an instantaneous phase value of last data in a section between a first wave number in the first data of the instantaneous phase change data and a last wave number in the last data of the instantaneous phase change data; calculating phase compensation data by taking a difference between the instantaneous phase change data and the linear instantaneous phase change data; calculating a compensation voltage control signal based on the phase compensation data and a phase modulation control coefficient that controls a phase modulation amount, which is set in the phase modulator and a phase amount controller that controls the phase amount given to the light transmitted through the phase modulator; storing the compensation voltage control signal in a controller; giving a phase to the light transmitted through the light path using the compensation voltage control signal output from the controller based on the compensation voltage control signal in accordance with a wavelength sweep timing of the light emitted from the wavelength sweep light source by the phase modulator; and deriving a position of the measurement surface based on the optical interference intensity signal.

According to an exemplary embodiment of the present disclosure, it is possible to construct an OCT measuring device and an OCT measuring method that can easily perform the dispersion compensation on various wavelength dispersions inherent in the light path.

Further advantages and effects in the exemplary embodiment of the present disclosure will be clarified from the specification and drawings. Such advantages and/or effects are provided by some exemplary embodiments and features described in the specification and drawings, respectively, but not all need to be provided in order to obtain one or more identical features.

Hereinafter, an exemplary embodiment relating to the present disclosure will be described.

Configuration of OCT Measuring Device 1

FIG. 1 is a diagram illustrating a configuration example of OCT measuring device 1 in an exemplary embodiment of the present disclosure. OCT measuring device 1 is a device for measuring a distance to measuring target object 20 which is a light reflector, a light scatterer, or the like, with high accuracy by using optical interference.

OCT measuring device 1 includes optical interferometer 9, wavelength sweep light source 2, measurement processor 3, AD (Analog to Digital) converter 4, photodetector 5, electro-optic element controller 6, measurement light path fiber end 7, and measurement light irradiation mechanism. 8.

Optical interferometer 9 divides the light emitted from wavelength sweep light source 2 into measurement light 18 and reference light 19, emits the divided measurement light 18 toward measurement surface 21, and then, generates an optical interference intensity signal indicating the intensity of interference between measurement light 18 reflected by measurement surface 21 and divided reference light 19. Wavelength sweep light source 2 is a light source that generates light of which the wavelength is swept (the light of which the wavelength changes with the elapse of time). Wavelength sweep light source 2 is, for example, a super luminescent diode (SLD) light source, an amplified spontaneous emission (ASE) light source, a super continuum (SC) light source, a swept source (SS) light source, or the like. The optical interference intensity signal is a signal indicating the intensity of interference between measurement light 18 reflected from measurement surface 21 and reference light 19. Hereinafter, the optical interference intensity signal is simply referred to as an optical interference signal. The optical interference signal is a signal of the optical interference generated by combining measurement light 18 and the reference light.

Optical interferometer 9 includes first coupler 10, first circulator 11, second coupler 12, second circulator 13, reference light path fiber end 14, collimator 15, reference mirror 16, and electro-optic element 17. In FIG. 1, the solid line connecting each configuration component in optical interferometer 9 represents an optical fiber.

Photodetector 5 is an optical sensor to which the optical interference signal generated by second coupler 12 by combining measurement light 18 and reference light 19 is input. AD converter 4 converts the analog optical interference signal output from photodetector 5 into a digital signal, and outputs the converted digital signal to measurement processor 3.

Measurement processor 3 is connected to wavelength sweep light source 2, AD converter 4, and electro-optic element controller 6. Measurement processor 3 is a signal generator that generates a phase amount indicator signal that indicates a phase amount (the phase amount given to the light passing through electro-optic element 17) of electro-optic element 17 based on the optical interference signal. Measurement processor 3 outputs the generated phase amount indicator signal to electro-optic element controller 6. The details of electro-optic element 17 will be described later.

In addition, various trigger signals output from wavelength sweep light source 2 and also the digital signal output from the AD converter 4 are input to measurement processor 3 for calculating the OCT measurement result. The various trigger signals are a wavelength sweep start trigger signal, a sampling trigger signal, and the like. The wavelength sweep start trigger signal is a signal for triggering AD converter 4 to start receiving the optical interference signal. The sampling trigger signal is a signal instructing to start sampling of the analog optical interference signal input to AD converter 4. The OCT measurement result is information that indicates a reflected measurement light intensity in the depth direction along measurement light axis 22 after the data processing such as Fourier transform is performed on the optical interference signal input to measurement processor 3 as a digital signal.

Electro-optic element controller 6 is connected to electro-optic element 17. Electro-optic element controller 6 is a phase amount controller that controls the phase amount given to the light transmitted through electro-optic element 17 based on the phase amount indicator signal. Electro-optic element controller 6 generates a compensation voltage control signal for controlling the phase amount, and outputs the generated compensation voltage control signal to electro-optic element 17. The compensation voltage control signal is a signal for electro-optic element 17 to control the phase amount given to reference light 19.

Electro-optic element 17 is a phase modulator arranged on the light path of optical interferometer 9. Electro-optic element 17 is an optical component that gives the phase to reference light 19 converted into parallel light by collimator 15. Collimator 15 is an optical component that converts the reference light output from reference light path fiber end 14 into the parallel light. Reference light path fiber end 14 is an end portion of the optical fiber that outputs reference light 19 input from first circulator 11 to collimator 15. Reference mirror 16 is an optical mirror that reflects the reference light converted into the parallel light by collimator 15.

First coupler 10 is a fiber optic component that divides the light emitted from wavelength sweep light source 2 into reference light 19 and measurement light 18, outputs the reference light to first circulator 11, and outputs measurement light 18 to second circulator 13.

First circulator 11 is a fiber optic component that transfers input reference light 19 to reference light path fiber end 14, and also transfers reference light 19 reflected from reference mirror 16 and input via reference light path fiber end 14 to second coupler 12.

Second coupler 12 is a fiber optic component that combines reference light 19 output from first circulator 11 and measurement light 18 output from second circulator 13 and inputs the combined light to photodetector 5 as the optical interference signal.

Second circulator 13 is a fiber optic component that transfers measurement light 18 input from first coupler 10 to measurement light path fiber end 7, and transfers measurement light 18 reflected from measurement surface 21 of measuring target object 20 and input via measurement light irradiation mechanism 8 and measurement light path fiber end 7, to second coupler 12.

Measurement light path fiber end 7 is an end portion of the optical fiber that outputs measurement light 18 divided by first coupler 10 to the outside of optical interferometer 9.

Measurement light irradiation mechanism 8 is an optical component configuration for appropriately converging measurement light 18 output from measurement light path fiber end 7 and for irradiating measurement surface 21.

In OCT measuring device 1 configured as described above, the light emitted from wavelength sweep light source 2 is divided into measurement light 18 and reference light 19 by first coupler 10. Measurement light 18 that passed through second circulator 13 is output from measurement light path fiber end 7, and irradiates measurement surface 21 of measuring target object 20 along measurement light axis 22 by measurement light irradiation mechanism 8. Measurement light 18 reflected from measurement surface 21 passes through second circulator 13 via measurement light irradiation mechanism 8 and measurement light path fiber end 7, toward second coupler 12.

Reference light 19 that passed through first circulator 11 is output from reference light path fiber end 14, becomes parallel light at collimator 15, transmits electro-optic element 17, and then, irradiates reference mirror 16. Reference light 19 reflected from reference mirror 16 transmits electro-optic element 17, passes through first circulator 11 via collimator 15 and reference light path fiber end 14 toward second coupler 12.

In optical interferometer 9, a measurement side light path and a reference side light path are formed as the light paths to which the light emitted from wavelength sweep light source 2 is guided.

Measurement side light path is a path for measurement light 18 to reach measurement surface 21 from first coupler 10 via second circulator 13, measurement light path fiber end 7, and measurement light irradiation mechanism 8, and then, inverted and reach second coupler 12 via measurement light irradiation mechanism 8, measurement light path fiber end 7, and second circulator 13.

Reference side light path is a path for reference light 19 to reach reference mirror 16 from first coupler 10 via first circulator 11, reference light path fiber end 14, collimator 15, and electro-optic element 17, and then, inverted and reach second coupler 12 via electro-optic element 17, collimator 15, reference light path fiber end 14, and first circulator 11.

OCT measuring device 1 is configured such that the measurement side light path length and the reference side light path length are substantially the same so that the optical interference signal is maximized. The light path length refers to an optical distance in consideration of the refractive index of an optical member, a glass material, an optical medium, or the like.

Action and Operation of Electro-Optic Element 17

Electro-optic element 17 is an optic element that utilizes a fact that the refractive index of the dielectric crystal changes when an electric field is applied to the dielectric crystal. The electro-optic element 17 includes a phase modulation type and an intensity modulation type. In the present exemplary embodiment, the phase modulation type electro-optic element 17 is used. In electro-optic element 17, an applied voltage required to change the phase by n is defined for each wavelength used in electro-optic element 17, and in the present exemplary embodiment, this applied voltage is set to a half-wavelength voltage $V_\pi$. Since the half-wavelength voltage $V_\pi$ depends on the wavelength λ of the light transmitted through electro-optic element 17, hereinafter, $V_\pi$ is referred to as $V_\pi(\lambda)$.

A phase of transmitted light when the light of wavelength λ is transmitted to electro-optic element 17 to which a half-wavelength voltage of $V_\pi(\lambda)$ is applied is in a state of advancing as much as π/2 compared to a phase of transmitted light when the light of wavelength λ is transmitted to electro-optic element 17 in a state where the half-wavelength voltage of $V_\pi(\lambda)$ is not applied.

In addition, a phase of the transmitted light when the light of wavelength λ is transmitted to electro-optic element 17 to which a half-wavelength voltage of $-V_\pi(\lambda)$ is applied is in a state being delayed as much as π/2 compared to a phase of the transmitted light when the light of wavelength λ is transmitted to electro-optic element 17 in a state where the half-wavelength voltage of $V_\pi$ (λ) is not applied.

By using electro-optic element 17 in this way, the phase of light can be freely advanced or delayed.

Flow of Oct Measurement

Figure 2:
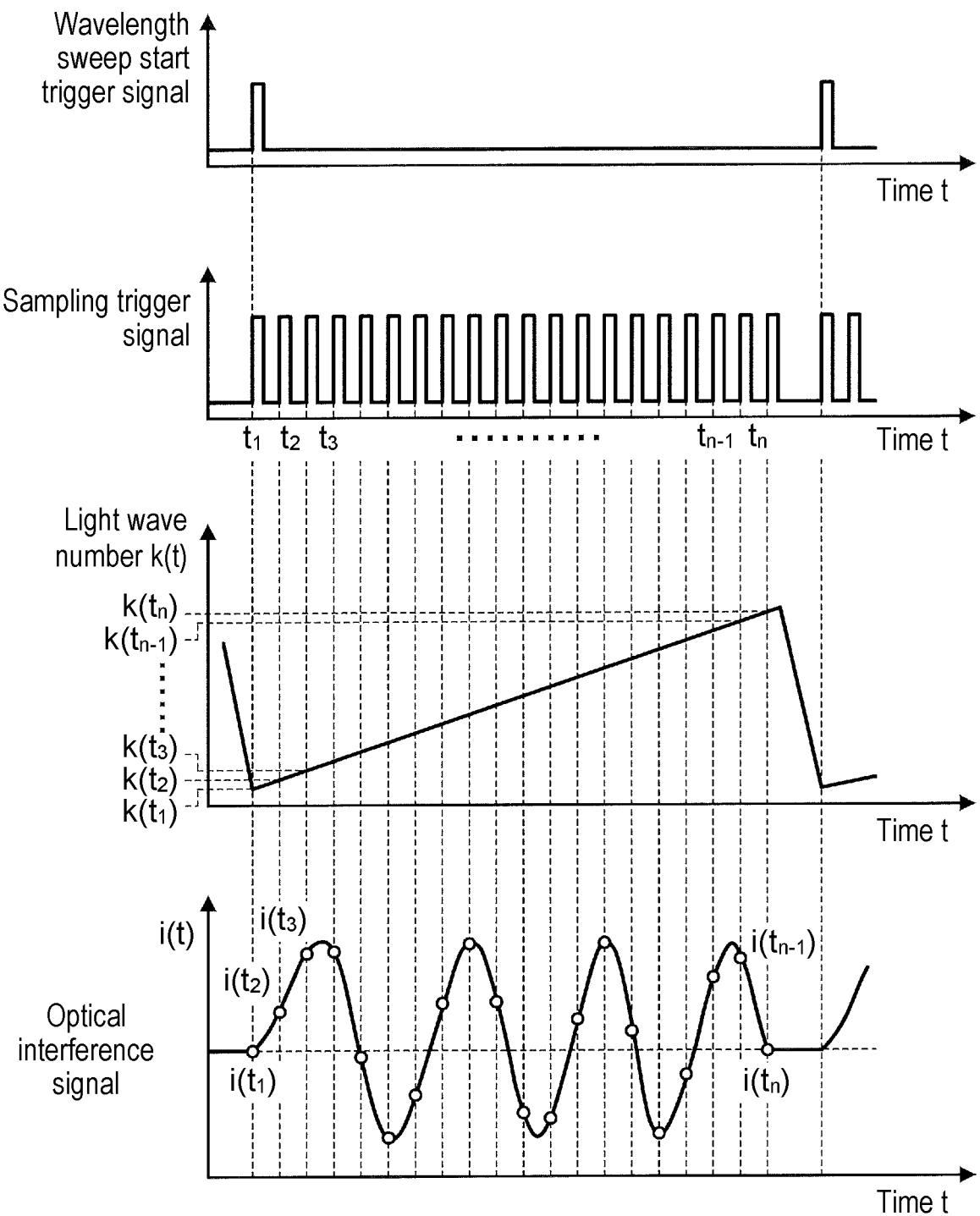
FIG. 2 is a diagram illustrating an operation timing for the OCT measuring device to perform an OCT measurement and data acquired by the OCT measuring device and the like when a wave number of light emitted from a wavelength sweep light source is linear with respect to a sweep time.

FIG. 2 are diagrams illustrating an operation timing at which OCT measuring device 1 performs the OCT measurement, and data acquired by OCT measuring device 1, and the like when the wave number of the light emitted from wavelength sweep light source 2 is linear with respect to the sweep time.

In FIG. 2, a wavelength sweep start trigger signal generated by wavelength sweep light source 2, a sampling trigger signal generated by wavelength sweep light source 2, a wave number (light wave number) of the light emitted from wavelength sweep light source 2, and an optical interference signal received by photodetector 5, are illustrated in order from the top. The horizontal axis represents time t. The dashed lines extending in the vertical direction are lines for clarifying the relationship between the data on the same time.

When the wavelength sweep start trigger signal is input to AD converter 4, AD converter 4 starts receiving the optical interference signal.

When the sampling trigger signal is input to AD converter 4, AD converter 4 converts the received optical interference signal into a digital signal.

In FIG. 2, sampling timings for sampling the optical interference signal are indicated by $t_1, t_2, t_3, \ldots t_{n-1}, t_n$ from the earliest timing. Here, n is a natural number equal to or greater than 1.

In FIG. 2, the light wave number corresponding to each sampling timing are indicated by $k(t_1), k(t_2), k(t_3), \ldots k(t_{n-1}), k(t_n)$. Here, n is a natural number equal to or greater than 1. The light wave number has a reciprocal relationship with the wavelength of the light.

When performing normal OCT measurement, as illustrated in the third diagram from the top of FIG. 2, In OCT measuring device 1, the wavelength sweep operation is performed such that the light wave number after the wavelength sweep start trigger signal is output is linearly changed with respect to the sweep time (time t).

Upon receiving the wavelength sweep start trigger signal, AD converter 4 generates interference signal data by sampling the optical interference signal from photodetector 5 at a fixed time interval (timing).

In FIG. 2, the interference signal data corresponding to each sampling timing is indicated by $i(t_1), i(t_2), i(t_3), \ldots i(t_{n-1}), i(t_n)$. Here, n is a natural number equal to or greater than 1.

AD converter 4 may perform the sampling of the optical interference signal from photodetector 5 by a preset sampling frequency at the timing when the wavelength sweep start trigger signal is received, or may start the sampling of the optical interference signal from photodetector 5 at the timing when the sampling trigger signal is received.

Figure 3:
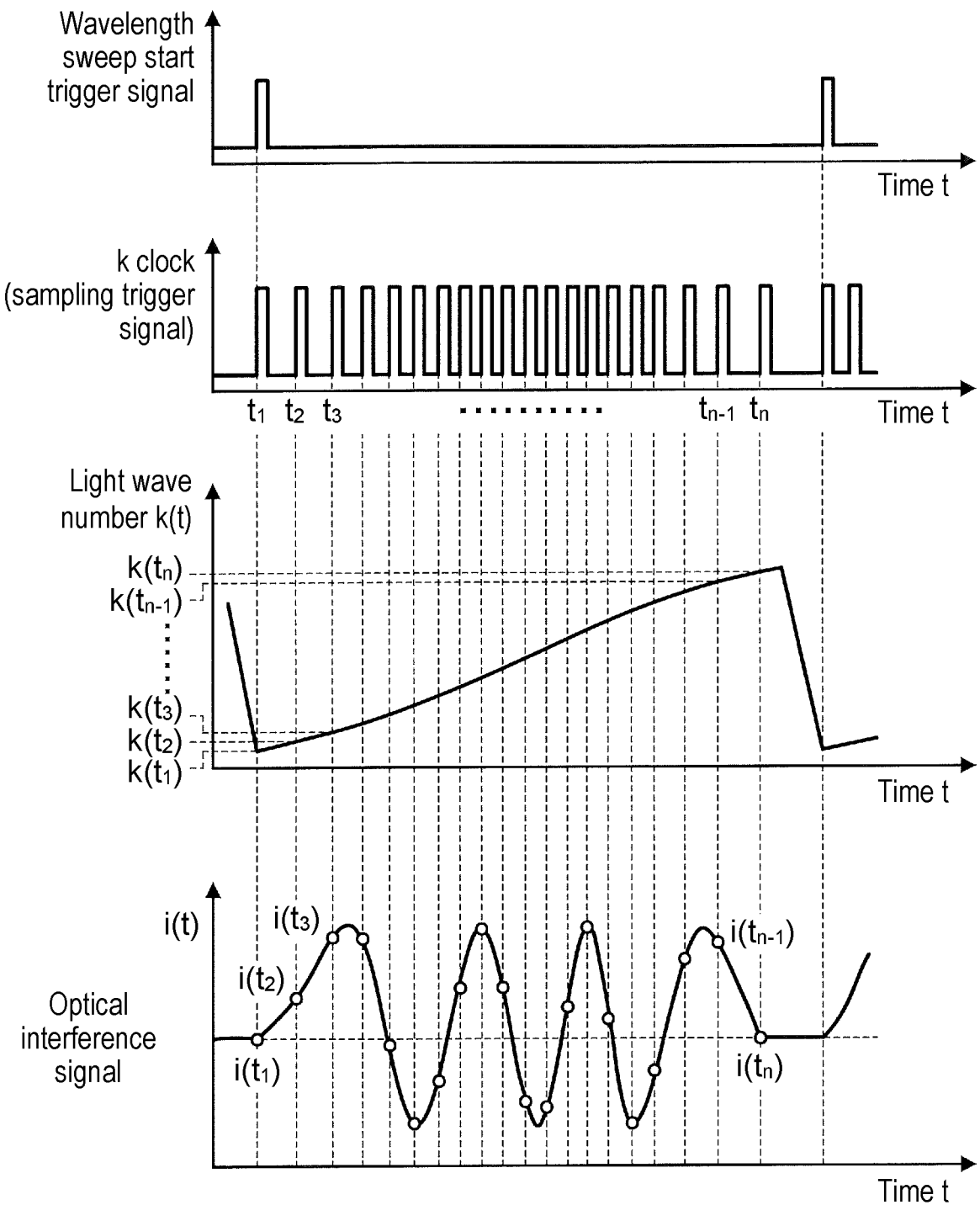
FIG. 3 is a diagram illustrating an operation timing for the OCT measuring device to perform the OCT measurement and data acquired by the OCT measuring device and the like when the wave number of the light emitted from the wavelength sweep light source does not linearly change with respect to a sweep time.

FIG. 3 are diagrams illustrating an operation timing for OCT measuring device 1 to perform the OCT measurement and data acquired by OCT measuring device 1 and the like when the wave number of the light emitted from wavelength sweep light source 2 does not linearly change with respect to the sweep time.

In FIG. 3, similarly to FIG. 2, the wavelength sweep start trigger signal generated by wavelength sweep light source 2, the sampling trigger signal generated by wavelength sweep light source 2, the wave number (light wave number) of the light emitted from wavelength sweep light source 2, and optical interference signal received by photodetector 5 are illustrated in order from the top. The horizontal axis represents time t. The dashed lines extending in the vertical direction are lines for clarifying the relationship between the data on the same time.

In addition, similarly to FIG. 2, the sampling timings $t_1$ to $t_n$ and the light wave numbers $k(t_1)$ to $k(t_n)$ are illustrated in FIG. 3. Here, n is a natural number equal to or greater than 1.

When the light source has characteristics in which the light wave number k of the light emitted from wavelength sweep light source 2 does not linearly change with respect to the sweep time, a sampling trigger signal having the timing that makes the wave number constant is separately generated from wavelength sweep light source 2. Hereinafter, such a sampling trigger signal will be referred to as a "k clock".

As illustrated in FIG. 3, since the light wave number k(t) changes non-linearly with respect to the time t after the wavelength sweep start trigger signal, it can be seen that the k clock is also output at an unequal pitch with respect to the time. In this case, upon receiving the wavelength sweep start trigger signal output from wavelength sweep light source 2, AD converter 4 generates the interference signal data by sampling the optical interference signal from photodetector 5 according to the timing of the k clock.

From the above description, the interference signal data i(t) generated by AD converter 4 is sampled at an equal wave number interval. Therefore, in any of FIG. 2 and FIG. 3, the interference signal data acquired by AD converter 4 are expressed $i(t_1), i(t_2), i(t_3), \ldots i(t_{n-1}), i(t_n)$, but the interference signal data i(t) acquired as digital data by AD converter 4 can be expressed as $i(k_1), i(k_2), i(k_3), \ldots i(k_{n-1}), i(k_n)$ regardless of the time interval.

Method of Acquiring Compensation Voltage Control Signal

Next, a method of obtaining the wavelength dispersion inherent in the optical system in OCT measuring device 1 by measurement, and acquiring the data of the compensation voltage control signal necessary for dispersion compensation of the wavelength dispersion by electro-optic element 17, will be described.

In FIG. 1, assuming that measuring target object 20 is a plate-shaped metal member, and a situation in which measurement light 18 is reflected from measurement surface 21 of measuring target object 20. As described above, measurement surface 21 is arranged in the vicinity of the position where the optical interference signal is maximized. At this time, the light interference signal is checked in advance, and the surface state of measurement surface 21 is adjusted so that the waveform of the optical interference signal is not saturated with the detection sensitivity of photodetector 5. For example, when measurement surface 21 is close to a mirror surface, since photodetector 5 may be easily saturated, it is preferable that measurement surface 21 is set to have a rough surface, a pearskin surface, or the like that scatters measurement light 18 to a certain extent.

Measuring target object 20 is not limited to the plate-shaped metal member as long as measurement light 18 does not penetrate into measuring target object 20, and may be, for example, a plate-shaped ceramic.

Normally, a difference photodetector is used as photodetector 5, and the output of photodetector 5 in this case has positive and negative detection limits from an output zero as a center. Therefore, it is necessary to be careful so that the interference waveform signal is not saturated in both the positive output and the negative output.

Even when a normal photodetector or the like is used as photodetector 5, it is needless to say that it is preferable to adjust the surface condition and the bias value of measurement surface 21 so that the detection sensitivity is not saturated when the bias operation is performed.

Figure 4:
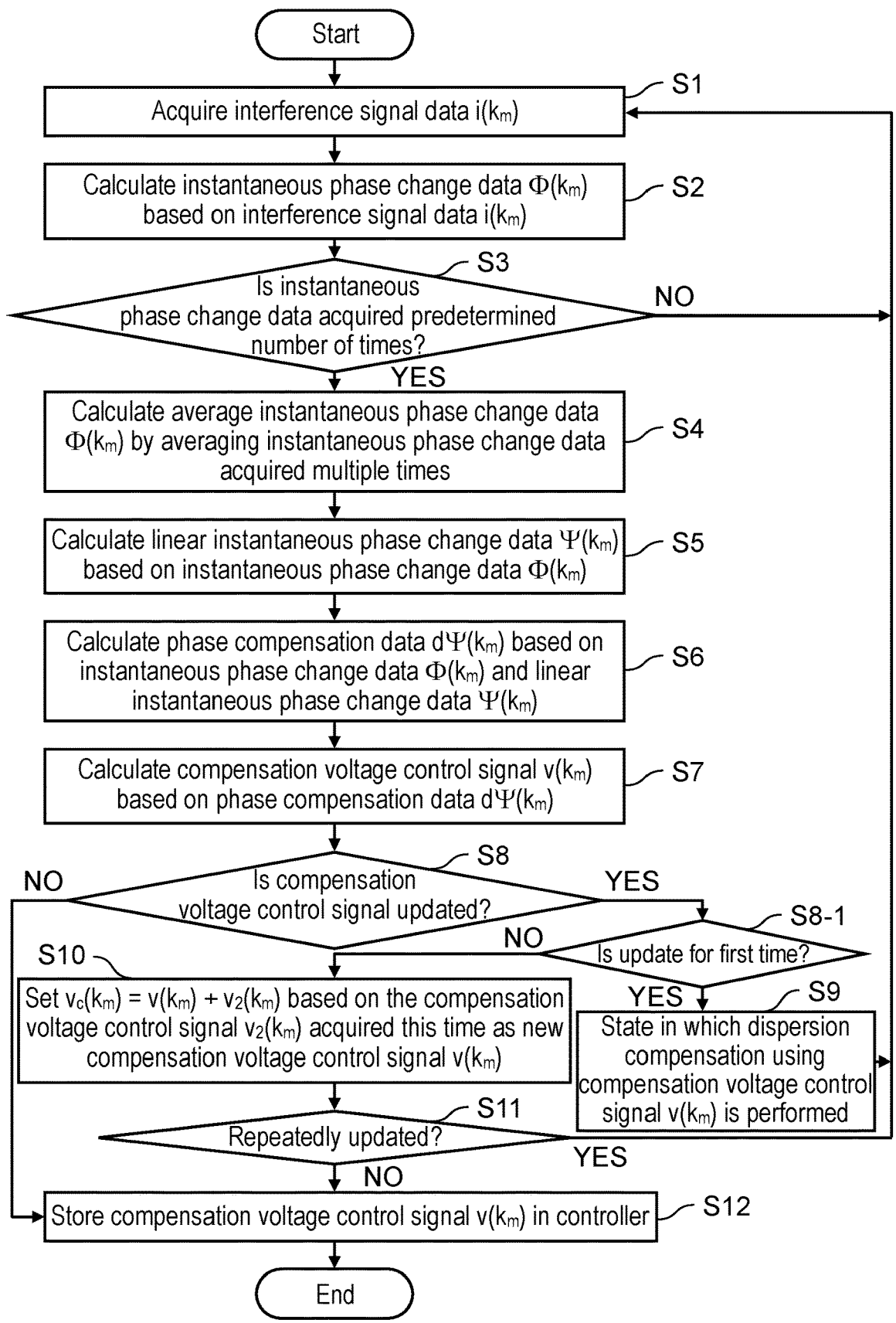
FIG. 4 is a flowchart for explaining a process for creating a compensation voltage control signal.

FIG. 4 is a flowchart for explaining a process for creating a compensation voltage control signal. In step S1, OCT measuring device 1 introduces the light emitted from wavelength sweep light source 2 in the same manner as when performing the normal OCT measurement, acquires the interference signal data $i(k_m)$ (m=1, 2, 3, ... n−1, n) by AD-converting the optical interference signal in accordance with the wavelength sweeping operation by wavelength sweep light source 2. Here, k represents the light wave number. In the normal OCT measurement, electro-optic element 17 gives a phase to the light transmitted through the reference side light path based on a predetermined compensation voltage control signal. The predetermined compensation voltage control signal is, for example, a current compensation voltage control signal or a calibration compensation voltage control signal.

In step S2, OCT measuring device 1 obtains the instantaneous phase change data $\varphi(km)$ based on the interference signal data $i(k_m)$ acquired in step S1. In order to derive the instantaneous phase change data $\varphi(k_m)$ from the interference signal data $i(k_m)$, a known technology such as Hilbert transform can be used. If the Hilbert transform of the interference signal data $i(k_m)$ is $j(k_m)$, the instantaneous phase change data can be obtained as $\varphi(k_m)=\arctan\{j(k_m)/i(k_m)\}$.

Here, $\arctan\{X\}$ is an inverse tangent function, and when $Y=\arctan\{X\}$, the relationship becomes $X=\tan\{Y\}$. Here, $\tan\{Y\}$ is a tangent function. The instantaneous phase change data $\varphi(k_m)$ obtained in this way represents the instantaneous phase value at each light wave number k ($k_1$, $k_2$, $k_3$, ... $k_{n-1}$, $k_n$) from which the interference signal data $i(k_m)$ is acquired. The interference signal data $i(k_m)$ qualitatively represents an amount corresponding to an amount of instantaneous temporal deviation in each light wave number k.

Figure 5:
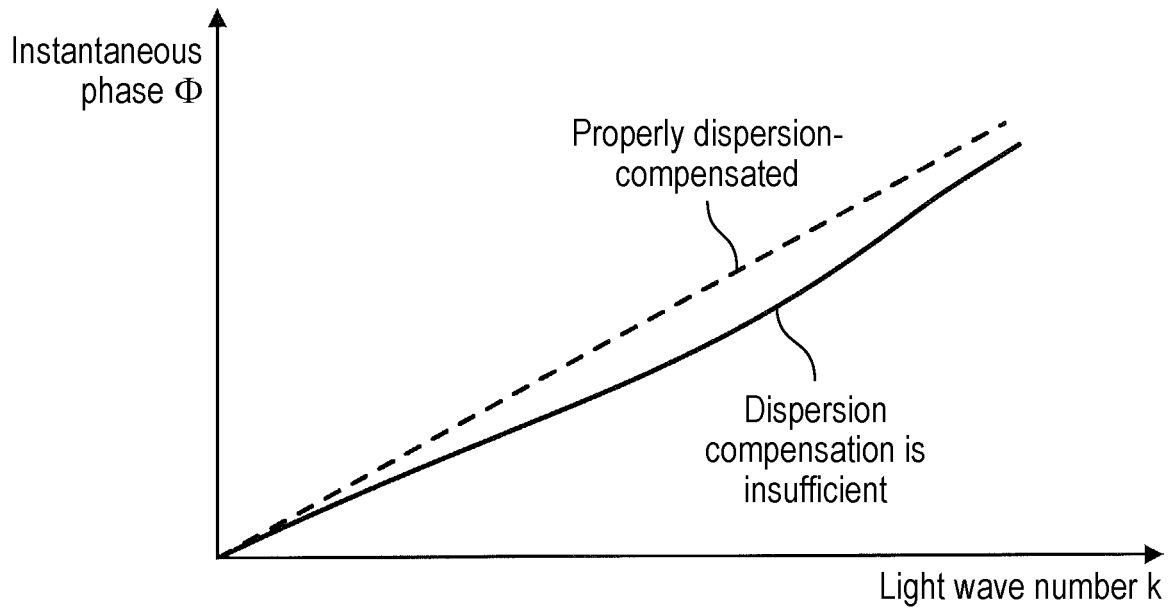
FIG. 5 is a diagram illustrating instantaneous phase change data $\varphi(k)$ for each light wave number k when a reference side light path and a measurement side light path are properly dispersion-compensated and when the dispersion compensation is insufficient.

FIG. 5 is a diagram illustrating the instantaneous phase change data $\varphi(k)$ for each light wave number k when the reference side light path and the measurement side light path are properly dispersion-compensated and when the dispersion compensation is insufficient. The horizontal axis represents the light wave number and the vertical axis represents the instantaneous phase.

Normally, since the arctan function (inverse tangent function) has a domain of $-\pi/2$ to $\pi/2$, when the phase value is equal to or larger than $\pi/2$ or equal to or smaller than $-\pi/2$, a discontinuity of $\pm\pi$ occurs in the instantaneous phase change data $\varphi(k)$. In this case, at the discontinuity point, so-called "phase unwrapping processing" is performed, in which $\pm\pi$ is appropriately added to convert the data into continuous data. FIG. 5 illustrates the data after the phase unwrapping processing is performed.

As described above, the instantaneous phase change data $\varphi(k)$ represents the instantaneous phase value at each light wave number k ($k_1$, $k_2$, $k_3$ ... $k_{n-1}$, $k_n$) from which the interference signal data $i(k)$ is acquired.

When the dispersion compensation is properly performed in each of the reference side light path and the measurement side light path of OCT measuring device 1, the phase change data $\varphi(k)$ linearly changes with respect to the light wave number k as illustrated by the dashed line in FIG. 5. This is because the interference signal data corresponding to a signal having the reflected light intensity of the measurement light reflected from measurement surface 21 at a specific measurement depth position changes at a constant cycle with respect to the light wave number k, and thus, the instantaneous phase also changes at a constant rate.

On the other hand, when the dispersion compensation is insufficient in each of the reference side light path and the measurement side light path, the instantaneous phase change data $\varphi(k)$ changes non-linearly with respect to the light wave number k, as illustrated by the solid line in FIG. 5. This is because, when the light path lengths of the reference side light path and the measurement side light path do not match depending on the wavelength, a deviation occurs in the sampling timing of the optical interference signal at each time with respect to the corresponding wave number, and thus, the interference signal data does not change at a constant period with respect to the wave number.

Figure 6:
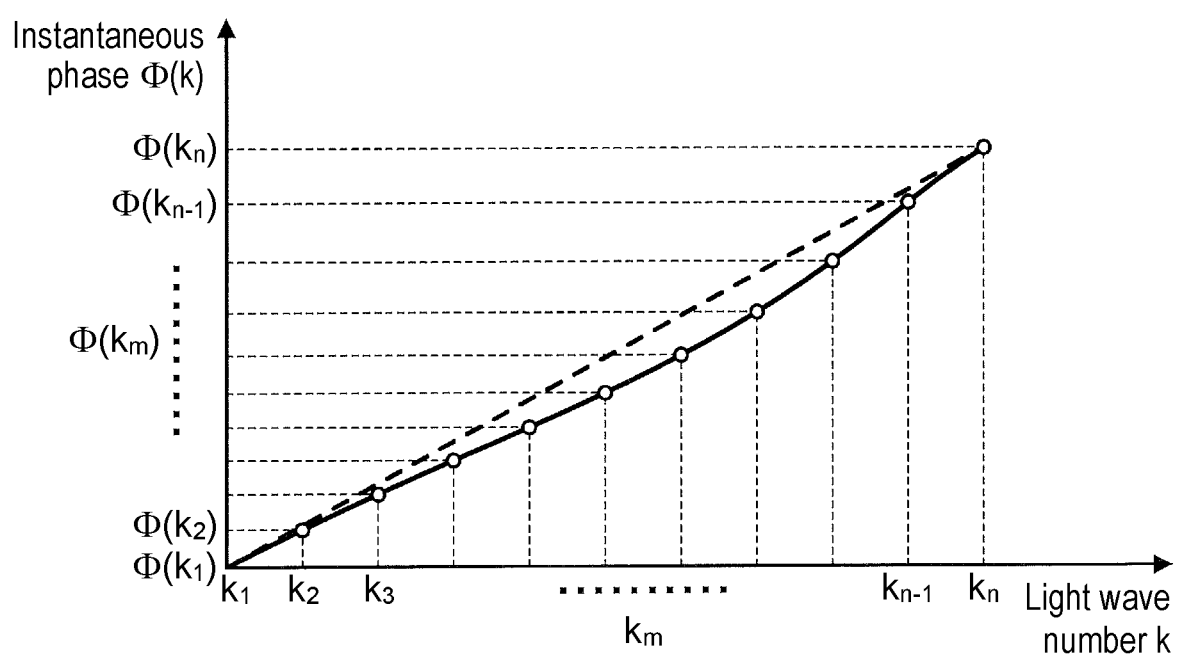
FIG. 6 is a diagram illustrating the instantaneous phase change data $\varphi(k)$ derived from interference signal data $i(k)$ when the dispersion compensation is insufficient in the reference side light path and measurement side light path.

FIG. 6 is a diagram illustrating the instantaneous phase change data $\varphi(k)$ derived from the interference signal data $i(k)$ when the dispersion compensation is insufficient in the reference side light path and the measurement side light path. The horizontal axis represents the light wave number and the vertical axis represents the instantaneous phase.

The points on the solid line actually represent the sampling points of the data in AD converter 4, and the light wave numbers corresponding to each sampling point are $k_1$, $k_2$, $k_3$ ... $k_{n-1}$, $k_n$. The interference signal data $i(k_m)$ (m=1, 2, 3 ... n−1, n) which is the source of derivation corresponds to the instantaneous phase change data $\varphi(k_m)$ (m=1, 2, 3 ... n−1, n).

Returning to FIG. 4, in step S3, when the instantaneous phase change data $\varphi(k_m)$ cannot be acquired a predetermined number of times (NO in step S3), OCT measuring device 1 repeats the processes subsequent to step S1.

When the instantaneous phase change data $\varphi(k_m)$ can be acquired a predetermined number of times (YES in step S3), OCT measuring device 1 performs the process in step S4. In step S4, OCT measuring device 1 obtains the average instantaneous phase change data $\Phi(k_m)$ by averaging the instantaneous phase change data $\varphi(k_m)$ acquired multiple times in step S3 for each light wave number km. This process is performed to reduce the noise data included in the interference signal data $i(k_m)$.

Here, if averaging is performed at the time of acquisition of the first interference signal data $i(k_m)$, the interference signal data waveform becomes dull due to the initial phase shift of the interference signal data waveform due to the repetition, and it necessary to note that the required instantaneous phase change data cannot be acquired.

In addition, during the OCT measurement operation, by repeatedly performing the wavelength sweep operation by wavelength sweep light source 2, the sampling timings are within the reproducibility range of the semiconductor, the electric circuit, and the like required for the light emission and the sweeping. Therefore, the light wave number at each sampling timing is the same as the light wave number ($k_1$, $k_2$, $k_3$ ... $k_{n-1}$, $k_n$) for the data acquisition with a sufficient accuracy required for the present exemplary embodiment.

In order to create the good compensation voltage control signal data, it is preferable that the number of acquisitions of the instantaneous phase change data is equal to or more than 20 times.

In step S5, OCT measuring device 1 calculates the linear instantaneous phase change data $\Psi(k_m)$ based on the instantaneous phase change data $\Phi(k_m)$ calculated in step S4. Specifically, OCT measuring device 1 calculates the linear instantaneous phase change data that changes linearly from the instantaneous phase value of the first data to the instantaneous phase value of the last data in a section between a first wave number of the first data of the instantaneous phase change data $\Phi(k_m)$ and a last wave number of the last data of the instantaneous phase change data $\Phi(k_m)$)

In step S6, OCT measuring device 1 calculates the phase compensation data $d\Psi(k_m)$ based on the instantaneous phase change data $\Phi(k_m)$ calculated in step S4 and the linear instantaneous phase change data $\Psi(k_m)$ calculated in step S5. Specifically, OCT measuring device 1 obtains the difference between the instantaneous phase change data $\Phi(k_m)$ and the linear instantaneous phase change data $\Psi(k_m)$, and calculates this difference as the phase compensation data.

In step S7, OCT measuring device 1 calculates the compensation voltage control signal $v(k_m)$ based on the phase compensation data $d\Psi(k_m)$ calculated in step S5 and a phase modulation control coefficient that controls the phase modulation amount set in electro-optic element 17 and electro-optic element controller 6.

Here, details of the data operation performed from step S5 to step S7 will be described with reference to FIG. 7 and FIG. 8.

Figure 7:
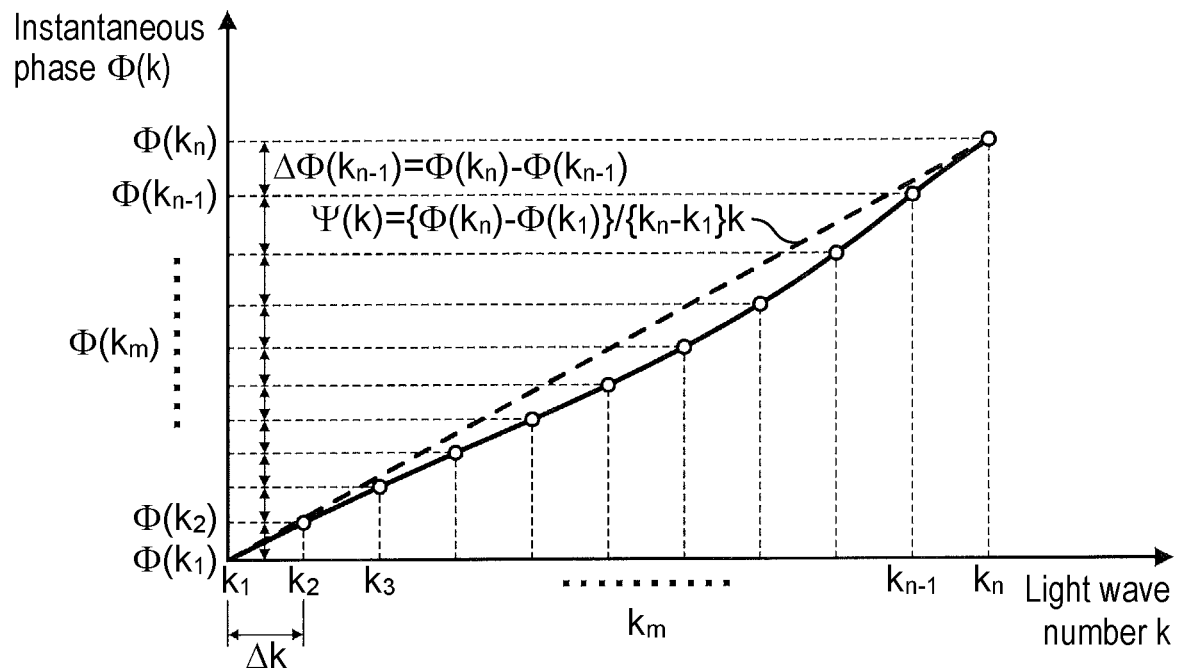
FIG. 7 is a diagram illustrating the instantaneous phase change data $\Phi(km)$ averaged in step S4.

FIG. 7 is a diagram illustrating the instantaneous phase change data $\Phi(k_m)$ averaged in step S4. The horizontal axis represents the light wave number and the vertical axis represents the instantaneous phase. The dashed straight line is the linear instantaneous phase change data $\Psi(k)$ connecting the first data $\Phi(k_1)$ and the last data $\Phi(k_n)$ of the instantaneous phase change data with a straight line.

The instantaneous phase change data $\Phi(k_m)$ illustrated in FIG. 7 is the data acquired by OCT measuring device 1 on which the dispersion compensation is not performed. Therefore, the instantaneous phase change data $\Phi(k_m)$ illustrated in FIG. 7 does not linearly change with respect to the light wave number k, but the instantaneous phase increment $\Delta\Phi(k_m)$ has unequal intervals with respect to the light wave number increments $\Delta k_m$ (m=1, 2, 3, ... n−1, n) having the equal intervals.

The light wave number increment $\Delta k_m$ having the equal intervals is obtained by $\Delta k_m = k_{m+1} - k_m$. The instantaneous phase increment $\Delta\Phi(k_m)$ is obtained by $\Delta\Phi(k_m) = \Phi(k_{m+1}) - \Phi(k_m)$.

Figure 8:
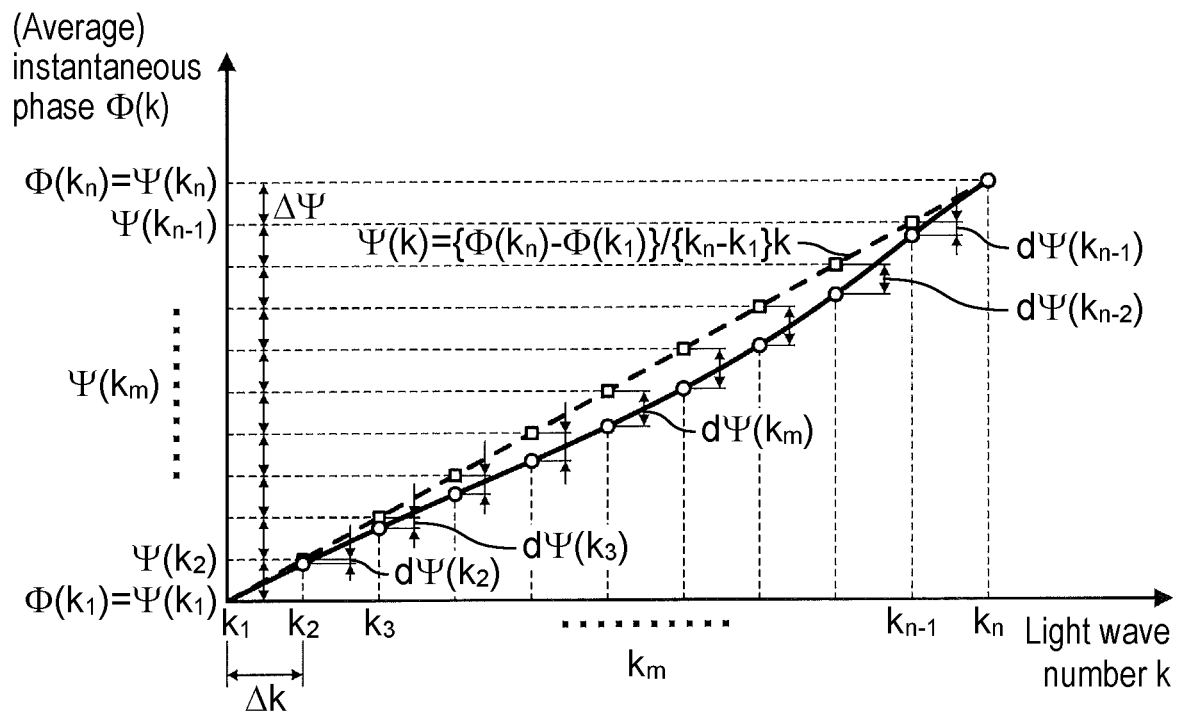
FIG. 8 is a diagram illustrating linear instantaneous phase change data $\Psi(km)$ corresponding to the instantaneous phase change data $\Phi(km)$ in FIG. 7.

FIG. 8 is a diagram illustrating the linear instantaneous phase change data $\Psi(k_m)$ corresponding to the instantaneous phase change data $\Phi(k_m)$ in FIG. 7. In FIG. 8, the illustration of the instantaneous phase change data $\Phi(k_m)$ is omitted due to space limitations. The linear instantaneous phase change data can be expressed by $\Psi(k_m) = \{\Phi(k_n) - \Phi(k_1)\}/\{k_n - k_1\} \cdot k$.

OCT measuring device 1 obtains the linear instantaneous phase change data $\Psi(k_m)$ at each sampling point so that the instantaneous phase increment is constant at the light wave number $k_m$ (m=1, 2, 3, ... n−1, n) at each sampling point.

In FIG. 8, the $\Psi(k_m)$ is indicated by square dots. The $\Psi(k_m)$ can be expressed as $\Psi(k_m) = \{\Psi(k_n) - \Phi(k_1)\}/\{k_n - k_1\} \cdot k_m$. When comparing the instantaneous phase change data $\Phi(k_m)$ and the linear instantaneous phase change data $\Psi(k_m)$, it can be seen that there is a difference when m is other than m=1 and m=n, that is, when the data is other than the first and last data. The difference is assumed to be $d\Psi(k) = \Psi(k) - \Phi(k)$.

The $d\Psi(k)$ is the difference between the measured instantaneous phase values with respect to the ideal instantaneous phase at the light wave number k. Therefore, if electro-optic element 17 gives a phase as much as $d\Psi(k)$ to the reference light path side, the obtained interference signal data will be as close as possible to the linear instantaneous phase change data. Therefore, hereinafter, $d\Psi(k_m)$ (m=1, 2, 3, ... n−1, n) will be referred to as the phase compensation data.

Here, it is assumed that the half-wavelength voltage at the wavelength $\lambda$ of electro-optic element 17 is given by $V_\pi(\lambda)$. Since the wavelength $\lambda$ and the light wave number k have a relationship of $\lambda = 1/k$, the half-wavelength voltage can also be expressed as $V_\pi(1/k)$. Therefore, the compensation voltage control v(k) given to electro-optic element 17 at the light wave number k can be expressed as $v(k) = \{V_\pi(1/k) \cdot d\Psi(k)\}/\pi$ using the phase compensation data $d\Psi(k_m)$. In this way, the compensation voltage control data $v(k_m) = \{V_\pi(1/k_m) \cdot d\Psi(k_m)\}/\pi$ can be determined for all the light wave number km for which the interference signal data was acquired. By setting $v(k_m)$ as the compensation voltage control signal, it is possible to compensate for the wavelength dispersion inherent in OCT measuring device 1.

Returning to FIG. 4, in step S8, when the compensation voltage control signal $v(k_m)$ acquired by the operations up to step S7 is updated to that having a smaller influence of variation (YES in step S8), OCT measuring device 1 performs the process in step S8-1. When the compensation voltage control signal $v(k_m)$ is not updated (NO in step S8), OCT measuring device 1 performs the process in step S12.

OCT measuring device 1 performs the process in step S9 when the compensation voltage control signal $v(k_m)$ is updated for the first time in step S8-1 (YES in step S8-1), and performs the process in step S10 when the compensation voltage control signal $v(k_m)$ is updated for the second time or later (NO in step S8-1).

In step S9, OCT measuring device 1 is in a state in which the dispersion compensation using the compensation voltage control signal $v(k_m)$ calculated in step S7 is performed. After that, OCT measuring device 1 acquires the compensation voltage control signal $v(k_m)$ again by repeating the processes step S1 and subsequent thereto.

In step S10, OCT measuring device 1 calculates $v_c(k_m) = v(k_m) + v_2(k_m)$ based on the compensation voltage control signal while setting the compensation voltage control signal $v(k_m)$ acquired at this time, which was acquired in a state in which the wavelength dispersion is compensated as $v_2(k_m)$. The $v_2(k_m)$ is the residual of the wavelength dispersion that cannot be fully compensated even if the dispersion compensation by $v(k_m)$ is performed. OCT measuring device 1 sets the newly calculated $v_c(k_m)$ as the latest compensation voltage control signal $v(k_m)$, and performs the process in step S11.

When the compensation voltage control signal is updated repeatedly in step S11 (YES in step S11), OCT measuring device 1 performs the processes in step S1 and subsequent thereof. When update of the compensation voltage control signal ends without being repeatedly updated (NO in step S11), OCT measuring device 1 performs the process in step S12.

Here, the details of the data operation from step S8 to step S11 will be described. In order to obtain the compensation voltage control signal having less variation, it is preferable to perform a procedure to obtain a series of compensation voltage control signals in a state in which the wavelength dispersion is compensated using the compensation voltage control signal v(km) obtained earlier, and update the current compensation voltage control signal.

When the compensation voltage control data acquired in a state in which the wavelength dispersion is compensated is $v_2(km)$, the new compensation voltage control signal is $vc(k_m) = v(k_m) + v_2(k_m)$. As described above, $v_2(k_m)$ is the residual of wavelength dispersion that cannot be fully compensated even if the dispersion compensation by $v(k_m)$ is performed. If this $vc(k_m)$ is used again as a compensation voltage control signal and the same operation is repeated, since $v_2(k_m)$ will converge to zero, and after repeating this operation as many times as necessary, $vc(k_m)$ may be adopted as the compensation voltage control signal.

In step S12, OCT measuring device 1 stores the compensation voltage control signal determined in the above-described procedure as data in a controller. The "controller" may be any one of electro-optic element controller 6 or measurement processor 3 as long as the operation in the method of performing the dispersion-compensated OCT measurement described later is realized.

In the present exemplary embodiment, the case where a metal plate is used for measuring target object 20 is described assuming the measurement of shape of a metal surface, a resin surface, and the like that does not transmit the light. If there exists any kind of light transmission medium in the measurement side light path until the measurement light arrives at measurement surface 21 of measuring target object 20 such as a metal plate, when determining the compensation voltage control signal, OCT measuring device 1 arranges the light transmission medium in the measurement light path and acquires the interference signal data.

For example, when measuring target object 20 is an eyeball, a retina and a fundus of the eyeball are measurement surface 21, the crystalline lens, cornea, and the like that exist in front of the retina, fundus, and the like are the light transmission medium in the measurement side light path. In addition, when measuring target object 20 is an underwater structure, the underwater structure is measurement surface 21, and the water existing in front of the structure is the light transmission medium in the measurement side light path.

Method of Performing Dispersion-Compensated OCT Measurement

Hereinafter, a method of performing the dispersion-compensated OCT measurement using the compensation voltage control signal $v(k_m)$ stored in step S12 will be described with reference to FIG. 9 and the like.

Figure 9:
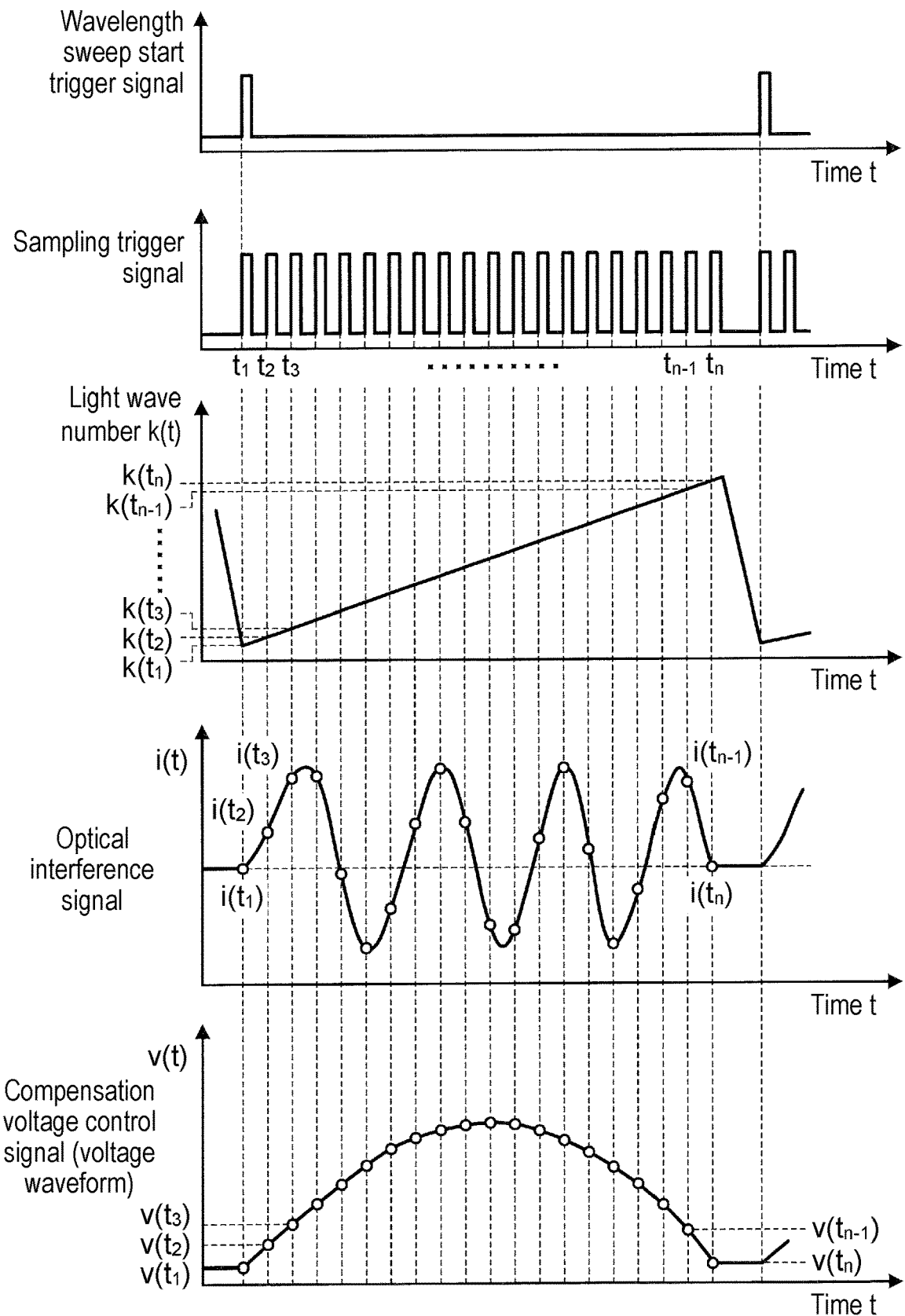
FIG. 9 is a diagram for explaining a method of performing dispersion-compensated OCT measurement using compensation voltage control signal $v(km)$.
Figure 10:
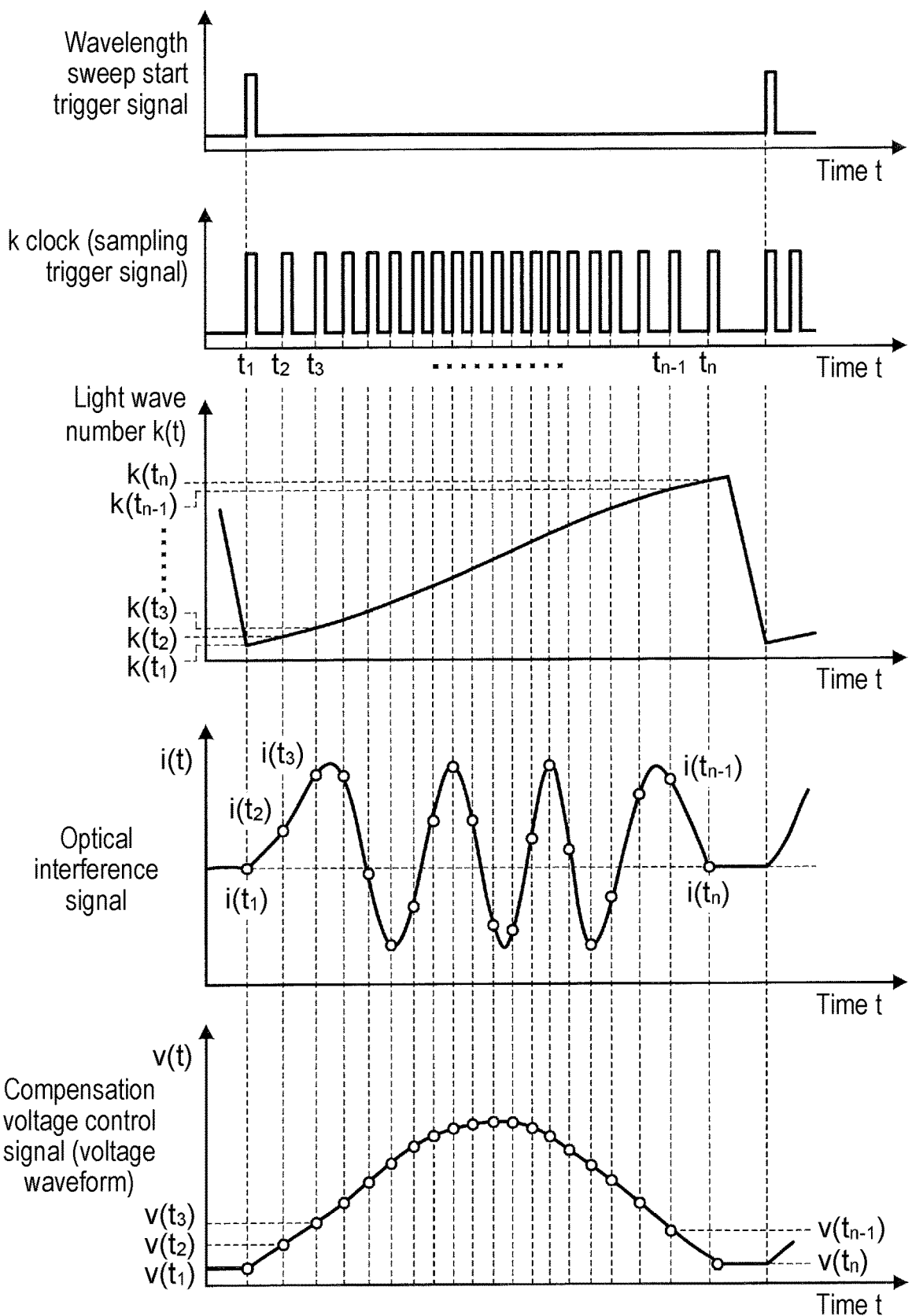
FIG. 10 is a diagram for explaining a method of performing dispersion-compensated OCT measurement using compensation voltage control signal v(km)

FIG. 9 and FIG. 10 are diagrams for explaining the method of performing the dispersion-compensated OCT measurement using the compensation voltage control signal $v(k_m)$. FIG. 9 illustrates the operation timing at which OCT measuring device 1 performs the OCT measurement, the data acquired by OCT measuring device 1, and the like when the wave number of the light emitted from wavelength sweep light source 2 is linear with respect to the sweep time.

FIG. 10 illustrates the operation timing at which OCT measuring device 1 performs the OCT measurement, the data acquired by OCT measuring device 1, and the like when the wave number of the light emitted from wavelength sweep light source 2 does not linearly change with respect to the sweep time.

FIG. 9 and FIG. 10 are respectively different from FIG. 2 and FIG. 3 in a point that the compensation voltage control signal data is added to the various data illustrated in FIG. 2 and FIG. 3. The horizontal axis represents time t. The dashed lines extending in the vertical direction are lines for clarifying the relationship between the data on the same time.

Similarly to FIG. 2 and FIG. 3, in FIG. 9 and FIG. 10, sampling timings for sampling the optical interference signal are indicated by $t_1, t_2, t_3, \ldots t_{n-1}, t_n$ from the earliest timing are illustrated, or the light wave number corresponding to each sampling timing are indicated by $k(t_1), k(t_2), k(t_3), \ldots k(t_{n-1}), k(t_n)$. Here, n is a natural number equal to or greater than 1.

In FIG. 9, as described above, AD converter 4 performs the sampling of the interference signal data $i(k_m)$ in accordance with the sampling trigger signal after wavelength sweep light source 2 issues the wavelength sweep start trigger signal.

Electro-optic element controller 6 of OCT measuring device 1 outputs the compensation voltage control signal $v(t_m)=v(k_m)$ as a voltage waveform in accordance with the time $t_m$ of the timing. In this way, electro-optic element 17 gives the previously determined phase to the reference light and realizes the dispersion compensation in OCT measuring device 1. This is the same in a case when wavelength sweep light source 2 is a light source having the characteristics of not changing linearly with respect to the sweep time.

In FIG. 10, as described above, AD converter 4 performs the sampling of the interference signal data $i(k_m)$ at the timing when the k clock emitted from wavelength sweep light source 2 is received.

Electro-optic element controller 6 of OCT measuring device 1 receives the k clock and outputs the compensation voltage control signal $v(t_m)=v(k_m)$ as a voltage waveform in accordance with the time $t_m$ of the timing. In this way, electro-optic element 17 gives the phase previously obtained for the reference light and realizes the dispersion compensation even when the light wave number k is non-linear with respect to the sweep time.

The reflected light intensity profile of the measurement light in the measurement depth direction, that is, the OCT measurement signal is obtained by performing the Fourier transform on the interference signal data $i(k_m)$ acquired by the above-described procedure at the operation timing, with respect to the wave number. The OCT measurement signal obtained in this way is a high-quality measurement result in which dispersion compensation is properly performed and there is little blurring in the depth direction.

Effects

As described above, OCT measuring device 1 in the present exemplary embodiment includes: wavelength sweep light source 2 that emits light of which a wavelength is swept; optical interferometer 9 that divides the light into measurement light 18 and reference light 19, emits measurement light 18 toward measurement surface 21 of measuring target object 20, and generates an optical interference intensity signal indicating an intensity of interference between measurement light 18 reflected from measurement surface 21 and reference light 19; electro-optic element 17 which is a phase modulator arranged in a light path of optical interferometer 9; measurement processor 3 which is a signal generator that derives a position of measurement surface 21 based on the optical interference intensity signal, and generates a phase amount indicator signal that indicates a phase amount of electro-optic element 17; and electro-optic element controller 6 which is a phase amount controller that controls the phase amount given to the light that is transmitted through electro-optic element 17. With this configuration, even if the optical components configuring the light path cause the wavelength dispersion, by controlling the phase amount of the light that is transmitted through electro-optic element 17, it is possible to compensate for the wavelength dispersion inherent in the optical components configuring the reference side light path and the measurement side light path. That is, in addition to the dispersion compensation from the measuring target object having the known wavelength dispersion, it is possible to perform the dispersion compensation for the unknown wavelength dispersion. As a result, high-quality measurement can be performed while suppressing deterioration of the OCT measurement data.

In addition, according to OCT measuring device 1 in the present exemplary embodiment, for example, by replacing or changing the components of OCT measuring device 1, especially the optical components such as lenses and mirrors configuring measurement light irradiation mechanism 8 on the measurement side light path, even when the wavelength dispersion characteristics change, easy and flexible dispersion correction can be performed by controlling the phase amount of the light that is transmitted through electro-optic element 17, without making and replacing the dispersion medium having the optical length suitable for the replaced optical component.

It is understood that, for example, the following aspects also belong to the technical scope of the present disclosure.

1. The phase modulator is electro-optic element 17.
2. Electro-optic element 17 is arranged in a reference light path through which the reference light is transmitted.
3. The OCT measuring method in the present exemplary embodiment includes:

detecting an optical interference intensity signal indicating an intensity of interference between measurement light 18 emitted toward measurement surface 21 of measuring target object 20 and reflected from measurement surface 21 and reference light 19 in a state in which phase modulator 17 arranged in a light path of optical interferometer 9 that generates the optical interference intensity signal indicating the intensity of interference with reference light 19 gives a phase to light transmitted through the light path based on a predetermined compensation voltage control signal, and calculating instantaneous phase change data indicating an instantaneous phase value at a wave number of the light emitted from wavelength sweep light source 2 that emits the light of which the wavelength is swept based on the optical interference intensity signal;

calculating linear instantaneous phase change data that linearly changes from an instantaneous phase value of first data to an instantaneous phase value of last data in a section between a first wave number in the first data of the instantaneous phase change data and a last wave number in the last data of the instantaneous phase change data;

calculating phase compensation data by taking a difference between the instantaneous phase change data and the linear instantaneous phase change data;

calculating a compensation voltage control signal based on the phase compensation data and a phase modulation control coefficient that controls a phase modulation amount, which is set in phase modulator 17 and phase amount controller 6 that controls the phase amount given to the light transmitted through the phase modulator 17;

storing the compensation voltage control signal in the controller (measurement processor 3 and electro-optic element controller 6);

giving a phase to the light transmitted through the light path using the compensation voltage control signal output from the controller based on the compensation voltage control signal in accordance with a wavelength sweep timing of the light emitted from wavelength sweep light source 2 by phase modulator 17; and deriving a position of measurement surface 21 based on the optical interference intensity signal.
4. In the calculating of the instantaneous phase change data, the optical interference intensity signals are acquired a plurality of times, and the instantaneous phase change data are calculated based on each of the optical interference intensity signals, and data obtained by averaging the plurality of instantaneous phase change data is used as the new instantaneous phase change data.
5. In the giving of the phase to the light transmitted through the light path, the light that is transmitted through the light path, to which the phase is given, is reference light 19.
6. In the calculating of the compensation voltage control signal, after calculating the compensation voltage control signal at least once or more times, a new compensation voltage control signal is calculated and the compensation voltage control signal is updated while giving the phase to the light transmitted through the light path using the compensation voltage control signal.
7. The phase modulator used in the OCT measuring method according to the present exemplary embodiment is an electro-optic element.

One exemplary embodiment of the present disclosure is suitable for an OCT measuring device.

What is claimed is:

1. An optical coherence tomography (OCT) measuring device comprising:
   a wavelength sweep light source that emits light of which a wavelength is swept;
   an optical interferometer that divides the light into measurement light and reference light, emits the measurement light toward a measurement surface of a measuring target object, and generates an optical interference intensity signal indicating an intensity of interference between the measurement light reflected from the measurement surface and the reference light;
   a phase modulator arranged in a light path of the optical interferometer;
   a signal generator that derives a position of the measurement surface and generates a phase amount indicator signal that indicates a phase amount of the phase modulator based on the optical interference intensity signal; and
   a phase amount controller that controls the phase amount given to the light that is transmitted through the phase modulator based on the phase amount indicator signal, wherein:
   the signal generator calculates linear instantaneous phase change data that linearly changes from an instantaneous phase value of first data to an instantaneous phase value of last data in a section between a first wave number in the first data of the instantaneous phase change data and a last wave number in the last data of the instantaneous phase change data, calculates phase compensation data by taking a difference between the instantaneous phase change data and the linear instantaneous phase change data, and generates the phase compensation data as the phase amount indicator signal, and
   the phase amount controller calculates a compensation voltage control signal based on the phase compensation data and a phase modulation control coefficient that controls a phase modulation amount, which is set in the phase modulator and a phase amount controller, and controls the phase amount by the compensation voltage control signal.

2. The OCT measuring device of claim 1, wherein the phase modulator is an electro-optic element.

3. The OCT measuring device of claim 1, wherein the phase modulator is arranged in a reference light path through which the reference light is transmitted.

4. The OCT measuring device of claim 1, further comprises a reference mirror that reflects modulated light from the phase modulator back to the phase modulator.

5. An optical coherence tomography (OCT) measuring method comprising:
- detecting an optical interference intensity signal indicating an intensity of interference between measurement light emitted toward a measurement surface of a measuring target object and reflected from the measurement surface and reference light in a state in which a phase modulator arranged in a light path of an optical interferometer that generates the optical interference intensity signal indicating an intensity of interference with the reference light gives a phase to light transmitted through the light path based on a predetermined compensation voltage control signal, and calculating instantaneous phase change data indicating an instantaneous phase value at a wave number of the light emitted from a wavelength sweep light source that emits the light of which a wavelength is swept;
- calculating linear instantaneous phase change data that linearly changes from an instantaneous phase value of first data to an instantaneous phase value of last data in a section between a first wave number in the first data of the instantaneous phase change data and a last wave number in the last data of the instantaneous phase change data;
- calculating phase compensation data by taking a difference between the instantaneous phase change data and the linear instantaneous phase change data;
- calculating a compensation voltage control signal based on the phase compensation data and a phase modulation control coefficient that controls a phase modulation amount, which is set in the phase modulator and a phase amount controller that controls the phase amount given to the light transmitted through the phase modulator;
- storing the compensation voltage control signal in a controller;
- giving a phase to the light transmitted through the light path using the compensation voltage control signal output from the controller based on the compensation voltage control signal in accordance with a wavelength sweep timing of the light emitted from the wavelength sweep light source by the phase modulator; and
- deriving a position of the measurement surface based on the optical interference intensity signal.

6. The OCT measuring method of claim 5, wherein, in the calculating of the instantaneous phase change data, the optical interference intensity signals each being the optical interference intensity signal are acquired a plurality of times, and the instantaneous phase change data are calculated based on each of the optical interference intensity signals, and data obtained by averaging the plurality of instantaneous phase change data is used as new instantaneous phase change data.

7. The OCT measuring method of claim 6, wherein, in the giving of the phase to the light transmitted through the light path, the light that is transmitted through the light path, to which the phase is given, is the reference light.

8. The OCT measuring method of claim 7, wherein, in the calculating of the compensation voltage control signal, after calculating the compensation voltage control signal at least once or more times, a new compensation voltage control signal is calculated and the compensation voltage control signal is updated while giving the phase to the light transmitted through the light path using the compensation voltage control signal.

9. The OCT measuring method of claim 5, wherein the phase modulator is an electro-optic element.

* * * * *